United States Patent [19]

Hearon

[11] 4,049,342
[45] Sept. 20, 1977

[54] MICROFICHE CARTRIDGE AND TRANSPORT APPARATUS

[75] Inventor: Guy Head Hearon, Malibu, Calif.

[73] Assignee: Dymat Photomatrix Corporation, Santa Monica, Calif.

[21] Appl. No.: 693,524

[22] Filed: June 7, 1976

[51] Int. Cl.² .................. G03B 23/08; B65H 29/00; B65H 5/00

[52] U.S. Cl. .................. 353/27 R; 271/184; 271/264; 271/DIG. 9

[58] Field of Search ............ 353/27 R, 27 A; 271/DIG. 9, 264, 246, 184

[56] References Cited

U.S. PATENT DOCUMENTS

| | | | |
|---|---|---|---|
| 3,528,735 | 9/1970 | Bluitt et al. | 353/27 A |
| 3,645,612 | 11/1969 | Streicher et al. | 353/27 R |
| 3,743,400 | 7/1973 | Haning et al. | 353/27 A |
| 3,797,925 | 3/1974 | Smitzer | 353/27 R |

*Primary Examiner*—Steven L. Stephan
*Attorney, Agent, or Firm*—Ralph B. Pastoriza

[57] ABSTRACT

A cartridge is provided for microfiche in the form of a box having a series of elongated rectangular pockets in a stacked array, one above the other and with exposed front openings. Each pocket is dimensioned to receive one microfiche. Cut-out portions are provided on opposite sides of the box to intersect the pockets and expose edge portions of each microfiche stored in the pockets. With this arrangement, appropriate friction wheels in the cut-out portions of the box can be provided on a stationary frame structure to eject a microfiche from the cartridge automatically and pass the same onto a microfilm viewer.

2 Claims, 4 Drawing Figures

MICROFICHE CARTRIDGE AND TRANSPORT APPARATUS

This invention relates to microfiche handling equipment and more particularly to a cartridge for storing and rendering available microfiche together with transport apparatus cooperating with the cartridge to enable automatic positioning of a selected microfiche in a viewer.

BACKGROUND OF THE INVENTION

Photographing documents on microfilm to save storage space is a well known technique and has wide application throughout industry. One type of photographic storage medium is termed a microfiche which constitutes a single film negative approximately the size of a normal index filing card and having thereon by way of example 60 different exposures arranged in rows and columns. A single such microfiche can in many instances serve to store the entire record of an individual; for example, a personnel record. In other instances, documented information which is 60 pages or less can be completely contained on one microfiche. It is, of course, possible to double the number of individual frames or exposures on a microfiche by simply making each frame half size. The use of microfiche as opposed to microfilm reels has certain advantages insofar as locating a particular image or frame to be viewed in that it is not necessary to wind through a large reel of film in order to arrive at the desired frame or image. Rather, the particular microfiche can be selected directly and placed in a specially designed viewer for microfiche and the desired frame or image then selected from those exposed on the microfiche.

Microfiche are normally stored in conventional boxes similar to those used for similarly sized index cards. In an actual operation of reviewing a particular file or document, the specific microfiche or microfiches if more than one microfiche is involved are simply selected from the box and placed in an appropriate viewer.

Where many thousands of microfiche are of record, it is often a burdensome manual operation to select the desired microfiche and place it in a viewer. Accordingly, steps have been taken towards attempting to automate the selection of a microfiche from a large storage bank for purposes of viewing the same. Since a single microfiche is very thin the same constituting only a single film and also relatively flexible, it has proven difficult to design any type of automatic system for feeding a selected microfiche to a viewer. Efforts thus far in this direction have taken the form of metal frames specifically designed to surround the edges of a microfiche, the frames being provided with appropriate catch means for cooperation with engaging machinery which can pull the framed microfiche from a storage area and automatically position it in a viewer.

The foregoing process is relatively expensive inasmuch as a frame is needed for each individual microfiche. It would be highly desirable if some techinque could be developed which would enable automatic retrieval and restorage of microfiche without having in any way to attach foreign parts to the microfiche itself.

BRIEF DESCRIPTION OF THE PRESENT INVENTION

With the foregoing considerations in mind, the present invention contemplates the provision of a microfiche cartridge within which a large number of individual microfiche may be stored but which is so designed as to cooperate with a transport apparatus so that any one of the stored microfiche can be selected automatically and passed from the cartridge to an appropriate viewer and thereafter be automatically returned to the cartridge.

With an arrangement of the foregoing type, the cartridge serves the dual function of enabling any one of a large number of microfiche to be readily selected for viewing and further serves as a storage housing for the microfiche.

Briefly, in accord with the present invention, the microfiche cartridge includes a series of elongated rectangular pockets in a stacked array one above the other and with exposed front openings. Each pocket is dimensioned to receive one microfiche, the cartridge itself having cut-out portions on opposite sides to expose opposite edge portions of each microfiche stored in the pockets.

With the foregoing structure, an open top frame is provided for receiving and guiding the cartridge for up and down motion. A motor means is provided for moving the cartridge in the frame in vertical incremental steps. The frame itself serves to support friction wheel means positioned on opposite sides of the cartridge for rotation about vertical axes. Peripheral portions of these friction wheels are received in the cut-out portions of the cartridge to engage the edge portions of the microfiche and initiate movement thereof out of a selected pocket determined by the vertical incremental position of the cartridge in the frame.

A conveyor means may also be provided to transport the ejected microfiche to an appropriate viewer and return the same microfiche to the cartridge after viewing all in an automatic manner.

BRIEF DESCRIPTION OF THE DRAWINGS

A better understanding of this invention will be had by now referring to the accompanying drawings in which.

DETAILED DESCRIPTION OF THE INVENTION

Figure 1:
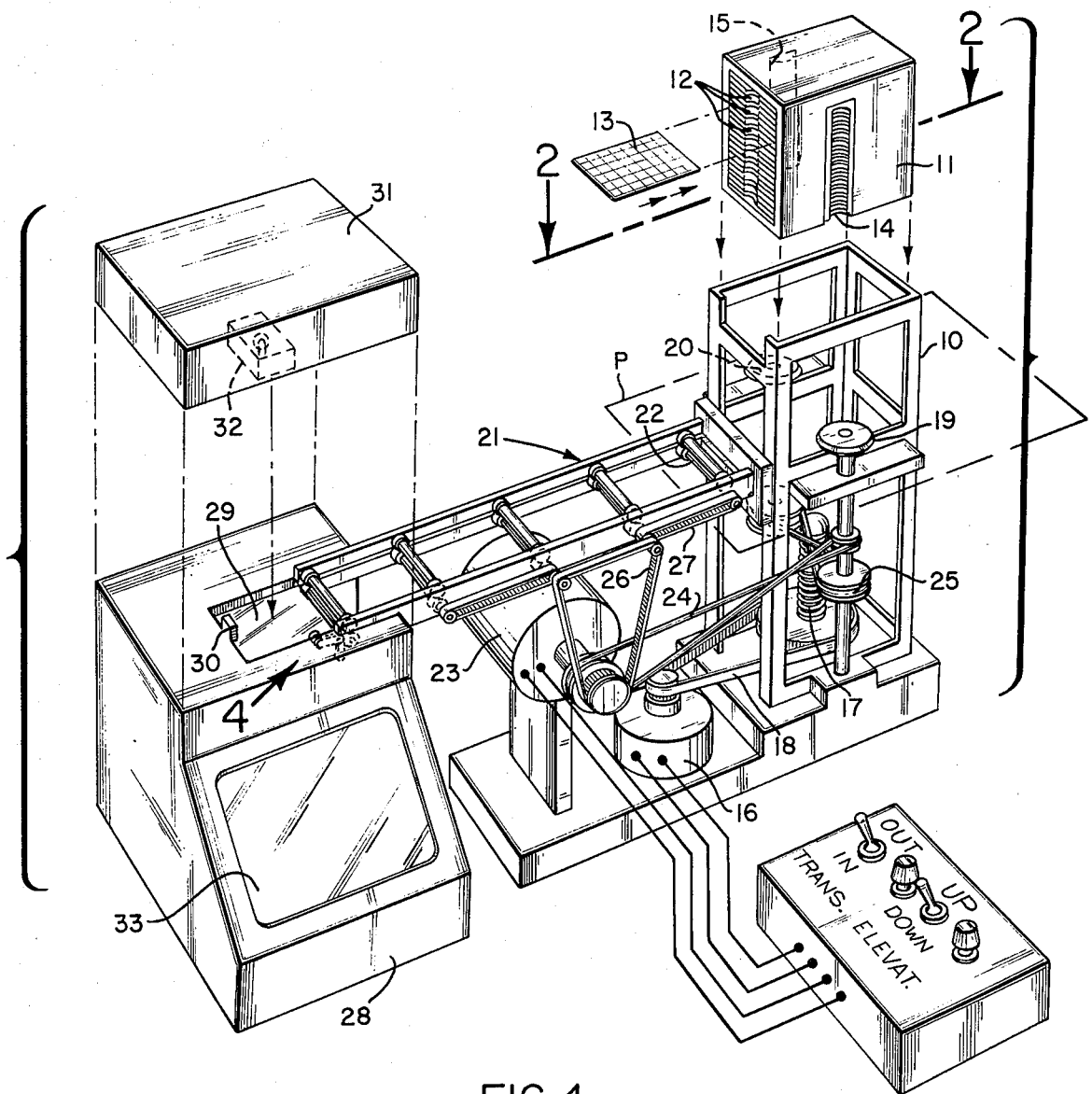
FIG. 1 is an exploded schematic perspective view of a prototype apparatus in accord with this invention.

Referring first to the central right hand portion of FIG. 1, there is designated by the numeral 10 an open top frame structure. Shown in exploded position above the open top of the frame structure 10 is a box shaped cartridge 11 having a series of elongated rectangular pockets 12 in a stacked array one above the other with exposed front openings. Each pocket is dimensioned to receive in its front opening a single microfiche, one such microfiche being shown exploded out the front of a pocket as at 13.

Opposite sides of the box shaped cartridge 11 are provided with vertical cut-out channels 14 and 15 intersecting opposite sides of the pockets to expose opposite edge portions of each microfiche when stored in the pockets.

As indicated by the dashed arrows, the cartridge 11 is arranged to be received in the open top of the frame 10 for guided movement in an up and down direction.

Referring to the lower central portion of FIG. 1, there is shown a first reversible motor means 16 for raising and lowering the cartridge 11 within the frame in discrete increments which, as will become clearer as the description proceeds, correspond to the vertical spacing between adjacent pockets. Towards this end, there is provided a lift screw 17 on the lower portion of the frame 10 coupled to the first reversible motor means 16 as by pulley belt 18. Rotation of the lift screw 17 in one direction serves to unthread the same to exert a lifting force on the bottom of the cartridge 11 when the same is received in the frame 10 whereas rotation of the lift screw in an opposite direction will thread the same into a lower position thereby permitting the cartridge 11 to drop or move vertically downwardly.

Cooperating with the cut-outs 14 and 15 in the box like cartridge 11 are friction wheels 19 and 20 mounted for rotation about vertical axes and lying in a horizontal plane P on opposite sides of the frame 10. The arrangement is such that peripheral portions of the wheels will be received in the cut-out channels to engage the opposite edges of a microfiche contained in a pocket positioned in the horizontal plane.

As indicted in the center of FIG. 1, there is provided a conveyor means 21 including drive rollers 22 supported by the frame 10 at the front opening of the pockets in the cartridge when the cartridge is received within the frame. This conveyor means lies in the horizontal plane P as indicated.

Beneath the conveyor means 21 is a second reversible motor means 23 arranged through appropriate coupling pulley belts 24 and 25 to rotate the friction wheels 19 and 20 and through coupling belts 26 and 27 to rotate the drive rollers 22. Additional pulley belts driven by the pulley belt 26 are provided for additional drive rollers, depending upon the overall length of the conveyor 21.

Figure 2:
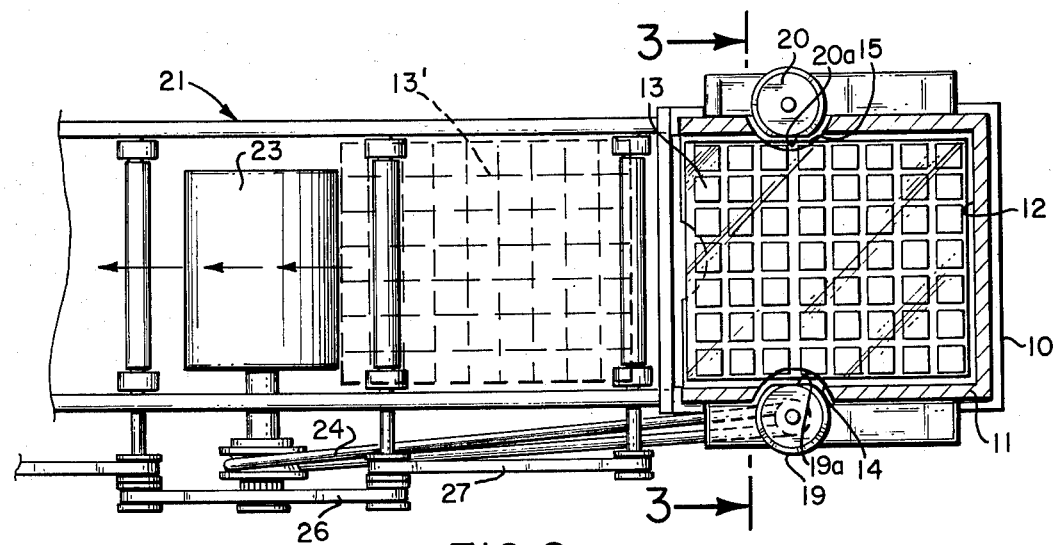
FIG. 2 is a fragmentary cross section taken in the direction of the arrows 2—2 of FIG. 1 with the exploded portions assembled together.

In combination with the cartridge, frame structure and conveyor is shown in FIG. 2 a microfilm viewer 28 having a receiving platen 29 positioned to receive a microfiche from the far end of the conveyor means 21. In this respect a stop means 30 in the form of a small vertical plate is provided at one end of the platen for engaging the forward edge of a microfiche from the conveyor means to position the microfiche on the platen.

The cover 31 of the viewer 28 is shown exploded away to expose the foregoing mentioned platen 29. This cover 31 may incorporate a light source 32 in a position such that when the cover is placed on the viewer, light is directed through an appropriate frame on the microfiche for viewing on the viewer screen 33.

In the top cross section of FIG. 2, the manner of engagement of opposite edge portions of a microfiche 13 in one the pockets 12 of the cartridge 11 by the friction wheels 19 and 20 is shown. Flats 19a and 20a on the wheels are normally positioned opposite the film edges so that up and down movement of the cartridge can take place. It will be appreciated, however, than when these friction wheels are rotated respectively in a counter-clockwise and clockwise direction as viewed in FIG. 2 through the medium of the belt 25 described in FIG. 1, that particular microfiche lying in the horizontal plane P of the rollers 19 and 20 will be ejected to the conveyor 21, the microfiche in such position being illustrated at dotted lines at 13'.

The front edge or opening of each of the pockets 12 as illustrated in FIG. 2 may include small arcuate cut-outs to expose the central front edge of the microfiche 13 for facilitating manual insertion and withdrawal of the microfiches when reloading or rearranging the microfiche in any one cartridge.

Figure 3:
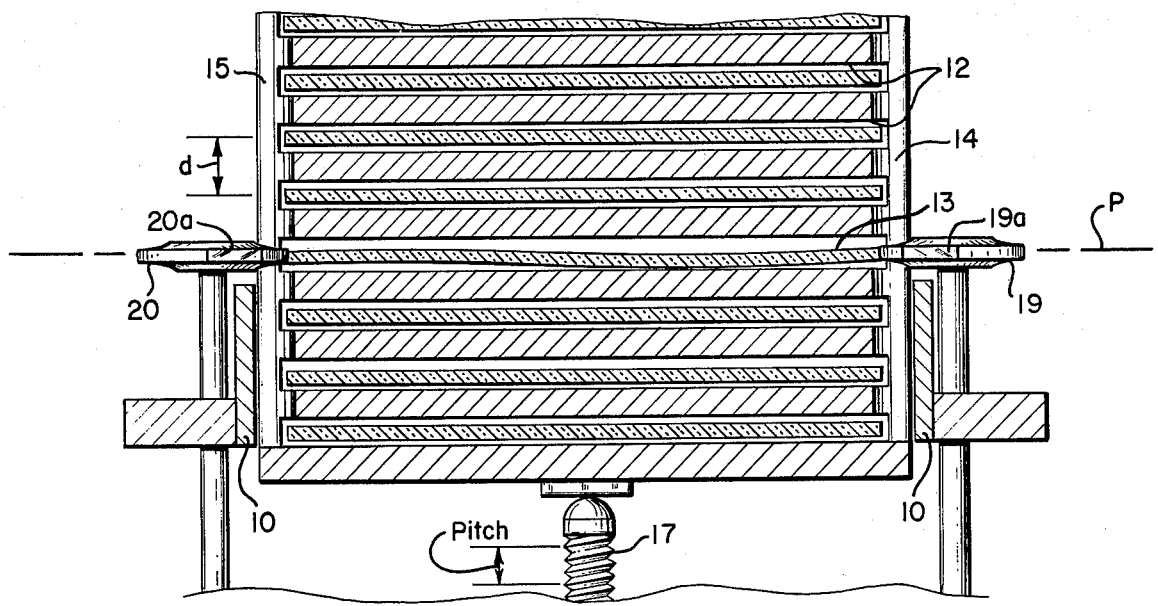
FIG. 3 is a greatly enlarged front cross section taken in the direction of the arrows 3—3 of FIG. 2; and, FIG. 4 is an enlarged fragmentary perspective view of a portion of the apparatus looking in the direction of the arrow 4 of FIG. 1.

FIG. 3 illustrates in greater detail the manner in which the friction wheels 19 and 20 engage opposite edge portions of a selected microfiche such as the microfiche 13. It will be noted in FIG. 3 that the particular microfiche engaged by the friction wheels will tend to bow slightly as a consequence of the frictional pressure exerted thereon to initially effect movement of the microfiche from the pocket. Further, in FIG. 3 there is defined by the double headed arrow the pitch for the lift screw 17 described in conjunction with FIG. 1. This pitch may be related to the vertical incremental distance $d$ between successive pockets 12 as shown in FIG. 3 such that one rotation of the lift screw will move the cartridge a distance corresponding to the distance $d$ between successive pockets so that a next microfiche will be positioned in the horizontal plane P for ejection or retraction by the friction wheels 19 and 20.

Figure 4:
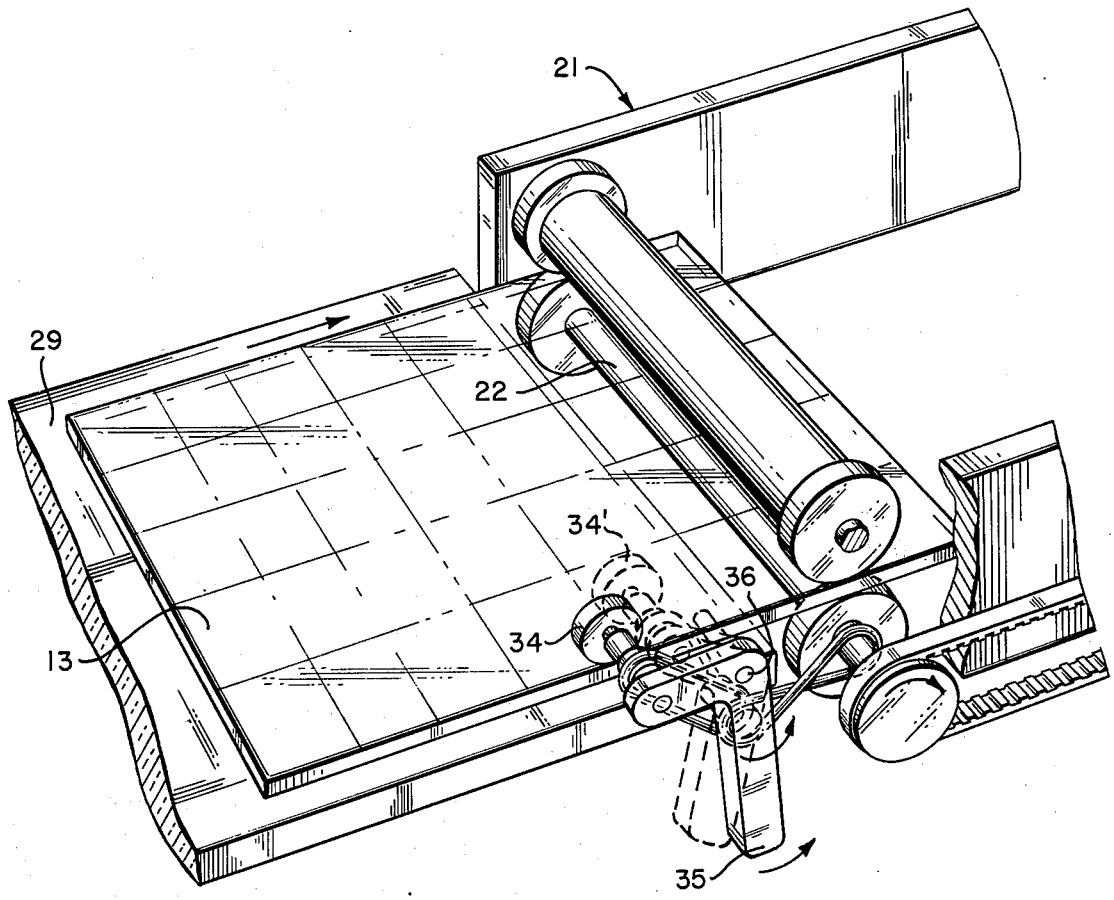

Referring now to FIG. 4 illustrating the end portion of the conveyor means 21 and the last set of drive rollers 22, there is shown a microfiche return transport initiating means in the form of a friction roller 34 rotatably mounted at one end of an inverted L-shaped lever 35 centrally pivoted at 36 to the end portion of the conveyor 21. This friction roller 34 is coupled through appropriate belts to the drive roller 22 in turn driven by the second reversible motor means 23 described in FIG. 1.

As is clear from FIG. 4, the friction roller 34 overlies a trailing edge portion of the microfiche 13 when fully positioned on the platen 29 of the viewer. Energization of the second motor means in a reverse direction results in automatic pivoting of the inverted L-shaped lever 35 about the pivot point 36 in a direction to cause the friction roller 34 to engage the microfiche 13 and feed it back onto the main portion of the conveyor means 21 for return to the pocket by the main drive rollers. The movement of the inverted L-shaped lever 35 is indicated by the dashed lines wherein when the microfiche 13 is moving into the platen 29 from the pocket, the roller 34 assumes the lift position illustrated at 34'.

The provision of the foregoing described microfiche return transport initiating means is a desirable feature of this invention as it will assure proper return in an automatic manner of a microfiche on the platen 29 to its associated pocket in the cartridge.

OPERATION

With the foregoing description of the cartridge and transport apparatus in mind, its entire operation will now be described.

Initially, microfiche are simply stored in cartridges of the type shown at 11 in FIG. 1 on appropriate shelves or in suitable drawers. The number of pockets in each boxlike cartridge may for example be one hundred or more so that one hundred individual microfiche can be stored in a single cartridge.

As a specific example, if there are individual personnel records for 100 persons making up a group, they may all be stored in a single cartridge and the individual records compared very quickly by means of the system of the present invention. Thus, the cartridge containing the 100 records would be removed from a shelf and positioned in the open top frame 10. From this point on, the reviewing of any one or more of the microfiche in any of the various pockets is carried out completely automatically in that it is only necessary for an operator to press appropriate buttons or switches to select the desired microfiche and then select the desired frame or frames on the microfiche by means of conventional controls in the microfilm viewer.

In FIG. 1, there is illustrated merely schematically a control box having up and down switch means and in and out switch means. The up and down switch means controls the first reversible motor 16 to automatically move the cartridge 11 one vertical increment each time the same is actuated. Thus, an operator will first select one of the pockets containing that microfiche which he wishes to review. After the selected pocket has been positioned in the horizontal plane P by means of the up-down control on the control box, the operator then simply energizes the second reversible motor means 23 of FIG. 1 by the in-out switch which will rotate simultaneously the friction wheels 19 and 20 and the drive rollers 22 on the conveyor to transport the microfiche in the selected pocket to the platen 29 of the viewer 28.

It will be understood, of course, that the operation of the in-out switch can be made automatically responsive to the completion of the postioning of the cartridge in a vertical direction so that actually only the vertical positioning need by commanded. However, when the operator has completed his viewing of a given microfiche which may run for a very long time, he will normally manually initiate the return of the microfiche be the return transport initiating means and main conveyor means as described by an appropriate switching or press-button operation. Essentially, this operation will reverse the direction of the second reversible motor 23 causing the drive rollers 22 and friction rollers 19 and 20 to rotate in reverse directions, thus feeding the microfiche back into its associated pocket.

In the out movement of the microfiche, its final positioning on the platen 29 is checked by the stop 30 whereas in the in movement, the rear closed end of the receiving pocket checks the microfiche from further movement when it is completely received in the pocket.

If the pitch of the lift screw 17 is made precisely equal to the spacing $d$ between adjacent pockets in the cartridge, exactly one rotation of the lift screw will move the cartridge through the desired incremental vertical distance to position a next adjacent pocket within the horizontal plane P. It is not necessary for the operator to carefully turn on and then turn off the first reversible motor 16 to effect this incremental movement. Rather, the operator need only press a button which starts the motor, an appropriate cam wheel and micro-switch being provided to insure that the motor will go through only one complete revolution; the cam opening the micro-switch to automatically stop the motor. A next press on the button will override the micro-switch and cause the motor to execute a second complete revolution. A similar cam and micro-switch arrangement can be provided for driving the friction wheels 19 and 20 to assure that the two wheels always stop with their flats 19a and 20a opposing the edges so that free movement of the cartridge in a vertical direction can take place. Such systems are so well known in the art, that they need not be described in further detail. Suffice it to say that any well known control may be utilized.

An enormous advantage of the system described in FIGS. 1 through 4 is the fact that the individual microfiche need not be tampered with or provided with a special metal frame or clip to enable their movement from a storage position to a viewing position. Rather, the microfiche in its original condition can be stored as is and yet viewed at will without any necessity for touching or otherwise manually handling the microfiche.

Various changes and modifications falling clearly with the scope and spirit of this invention will occur to those skilled in the art. The microfiche cartridge and transport apparatus accordingly is not to be thought of as limited to the specific embodiment set forth merely for illustrative purposes.

What is claimed is:

1. A microfiche cartridge and transport apparatus for moving a selected microfiche onto a receiving platen of a microfiche viewer, including, in combination:
   a. an open top frame structure;
   b. a box shaped cartridge having a series of elongated rectangular pockets in a stacked array, one above the other, with exposed front openings, each pocket being dimensioned to receive in its front opening a single microfiche, opposite sides of said box shaped cartridge having vertical cut-out channels intersecting opposite sides of said pockets to expose opposite edge portions of each microfiche when stored in the pockets, said box shaped cartridge being receivable in the open top of said frame for guided movement in an up and down direction;
   c. a first reversible motor means for raising and lowering said cartridge within said frame in discrete increments corresponding to the vertical spacing between adjacent pockets;
   d. friction wheels mounted for rotation about vertical axes and lying in a horizontal plane on opposite sides of said frame, peripheral portions of said wheels being received in said cut-out channels to engage the opposite edges of a microfiche contained in a pocket positioned in said horizontal plane;
   e. a conveyor means including drive rollers supported by said frame at the front opening of that pocket in said horizontal plane, said conveyor means extending at its far end to said platen and including a return transport initiating means in the form of a friction roller overlying but not normally engaging a trailing edge portion of a microfiche when fully positioned on said platen; and,
   f. a second reversible motor means for rotating said friction wheels, drive rollers and said friction roller whereby energization of said first motor means to move said cartridge in an up or down direction positions a selected pocket and its associated microfiche in said horizontal plane, energization of said second motor means in one direction transporting said microfiche from said pocket onto said conveyor means and onto said platen, and energization of said second motor means in a reverse direction causing said friction roller to engage said microfiche and feed it back onto the main portion of said conveyor means for return to said pocket by said main drive rollers and friction wheels.

2. An apparatus according to claim 1, in which each of said friction wheels includes a flat in its periphery, said wheels stopping with their respective flats opposing the edges of a microfiche returned to the pocket in said horizontal plane so that said cartridge is free to be moved in a vertical direction.

* * * * *

UNITED STATES PATENT AND TRADEMARK OFFICE
CERTIFICATE OF CORRECTION

PATENT NO. : 4,049,342
DATED : Sept. 20, 1977
INVENTOR(S) : Guy Head Hearon

It is certified that error appears in the above-identified patent and that said Letters Patent are hereby corrected as shown below:

Column 1 between the title and first paragraph insert the following:

-- The Government has rights in this invention pursuant to Contract F30602-77-C-0007 by the Department of the Air Force. --.

Signed and Sealed this

Nineteenth Day of June 1979

[SEAL]

Attest:

RUTH C. MASON
*Attesting Officer*

DONALD W. BANNER
*Commissioner of Patents and Trademarks*